DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED JUNE 1, 1976

947 O.G. 12

T947,003

OVERBASED NONIONIC PLUS HIGH MOLECULAR WEIGHT SULFONATE WATERFLOOD ADDITIVE AND PROCESS OF USING SAME

Charles R. Clark and Oliver C. Kerfoot, Ponca City, Okla., and Delmar D. Krehbiel, Lubbock, Tex., assignors to Continental Oil Company, Ponca City, Okla.

Continuation of abandoned application Ser. No. 342,018, Mar. 16, 1973. This application May 14, 1975, Ser. No. 577,249

Int. Cl. E21b *43/20, 43/22*

U.S. Cl. 252—8.55 D

No Drawing. 23 Pages Specification

An overbased waterflood additive comprising a water-soluble nonionic surfactant (such as an ethoxylated alkanol) plus a water-insoluble high molecular weight hydrocarbon sulfonate having an equivalent weight of about 400 to about 600 plus an overbasing amount of a base component such as an alkali metal hydroxide, ammonium hydroxide, or an alkali metal carbonate is prepared and is injected into a petroliferous formation to improve a waterflood process. Sufficient overbasing base component is employed such that the ratio: "weight of excess base component/weight of sulfonate" is about 0.03 to about 5.0.